Nov. 12, 1957    G. L. COTTER    2,812,982
FLUID PRESSURE BRAKE APPARATUS
Filed July 21, 1953
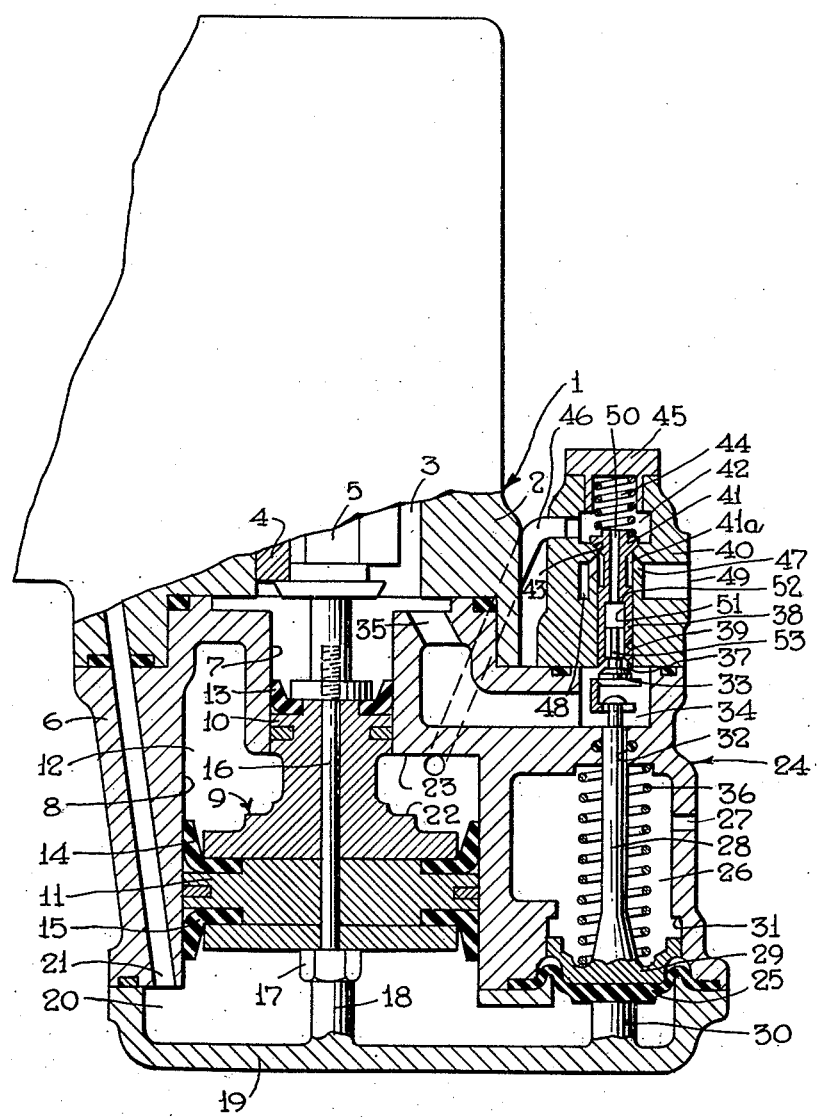
INVENTOR.
George L. Cotter
BY
Adelbert A. Steinmiller
ATTORNEY

United States Patent Office 2,812,982
Patented Nov. 12, 1957

2,812,982

FLUID PRESSURE BRAKE APPARATUS

George L. Cotter, Pittsburgh, Pa., assignor to Westinghouse Air Brake Company, Wilmerding, Pa., a corporation of Pennsylvania Application July 21, 1953, Serial No. 369,479

3 Claims. (Cl. 303—14)

This invention relates to fluid pressure brake apparatus and more particularly to improved means for controlling operation of a selector valve device of the type disclosed in U. S. Patent No. 2,464,977 issued March 22, 1949, to A. T. Gorman and adapted to be associated with the usual brake controlling valve device on a locomotive in order to permit the brakes on said locomotive to be controlled in unison with, or independently of, the brakes on cars connected thereto.

The selector valve device shown in the aforementioned patent to Gorman is of the type currently in use in a so-called independent application and release portion of the No. 24-RL locomotive brake equipment manufactured by the assignee of this application. This selector valve device comprises, briefly, a relatively small single-acting piston operatively connected to a slide valve and constantly subject at one side to a control pressure and further comprises a coaxially aligned, larger single-acting piston, the opposite side of which is normally subject to atmospheric pressure but is adapted to be subjected to main reservoir pressure for effecting movement of said larger piston against opposition of said small piston (by virtue of the differential effect of their respective areas) for thereby moving the slide valve from a normal position, which provides for control of the brakes on the locomotive in unison with or independently of those on connected cars of a train, to a release position, for releasing the brakes on the locomotive independently of those on the cars of the train. In order to move the selector valve from its release position back to normal position the main reservoir pressure acting on the larger piston is vented to atmosphere, and the control pressure, acting on the small piston, causes the slide valve to be returned to its normal position; the adjacent faces of said larger and smaller pistons being exposed to atmospheric pressure in a non-pressure chamber between said pistons. In accordance with the usual practice, where the locomotive is hauled as a dead engine, the aforementioned control pressure is about 50 p. s. i. (about 20 p. s. i. less than normal brake pipe pressure because of a spring bias force on the usual dead engine check valve) instead of main reservoir pressure of about 140 p. s. i. obtained when the locomotive is run as a live engine. With such reduced control pressure there is a possibility that the force exerted thereby on the small piston may be insufficient to return the slide valve to its normal position, especially if there is unusually high frictional resistance between the moving parts due to dirt, swelling of the packing cup on the small piston, leakage of control pressure past said small piston to atmosphere, or other causes.

One object of the invention is therefore to provide, in a brake apparatus of the type disclosed in the aforementioned patent to Gorman, an improved selector valve device so constructed and arranged as to positively assure movement of its slide valve into both its normal and release positions.

Another object is to provide, for use with a standard independent application and release portion of the current 24-RL locomotive brake equipment, an improved selector valve device so constructed and arranged as to assure positive movement of the selector slide valve to both its normal and release positions and at the same time accomplish this desired result wtih a minimum of structural change to existing equipment, for thereby reducing both the time and cost of modifying such equipment by addition of the improved structure hereinafter to be described.

Other objects and advantages will become apparent from the following more detailed description of the invention.

In the accompanying drawing, the single figure is an elevational view, partly in section and partly in outline, of a selector valve device embodying the invention.

*Description*

Referring to the drawing, the reference numeral 1 designates the improved selector valve device which is especially adapted for use with the independent application and release portion of a locomotive fluid pressure brake apparatus of the 24-RL type disclosed in the aforementioned patent to Gorman.

The selector valve device 1 comprises the conventional casing portion 2 which also partially defines the usual independent application and release portion; a chamber 3 formed in, and opening through one wall of said casing portion and adapted to be constantly charged with fluid under pressure from the main reservoir (not shown) or brake pipe (not shown), according to whether the locomotive is operated as a live or dead engine, respectively. The selector valve device 1 further comprises a slide valve 4 disposed within chamber 3 and having a normal position in which the brakes on the locomotive are adapted to be controlled in unison with those on the connected cars in a train, either through the medium of the usual straight air pipe (not shown) or brake pipe (not shown) or independently of those on said cars through the usual application pipe connected to the engineer's independent brake valve device, and also having a release position for releasing the brakes on the locomotive independently of those on the cars of a train or for preventing application of the locomotive brakes when an application of the car brakes is effected. An operating stem 5 disposed partly within and projecting exteriorly of chamber 3 is provided for moving the slide valve 4. All of the above-mentioned components of the selector valve device 1 may be identical in structure and operation with those shown in the aforementioned patent to Gorman and in current use in the 24-RL locomotive brake equipment.

According to the invention and as shown in the drawing, the selector valve device 1 further comprises a hollow casing portion 6 sealingly secured to the conventional casing portion 2 and closing the open end of chamber 3. The casing portion 6 has a piston bore 7 in coaxial alignment with stem 5 and open at its one end to chamber 3 and at its opposite end to a larger, coaxially aligned piston bore 8. A piston device 9 comprises a relatively small piston head 10 slidably guided within the bore 7 and a larger, double-acting piston head 11 slidably guided within the bore 8, thereby forming a control chamber 12 between said piston heads chargeable with fluid under pressure or ventable to atmosphere in the manner to be described subsequently. The piston head 10 is preferably provided with the usual packing cup 13 for preventing leakage of fluid under pressure from chamber 3 to chamber 12, while the piston head 11 is preferably provided with oppositely arranged packing cups 14, 15 for preventing leakage of fluid under pressure from and to the chamber 12, respectively, for reasons which will become apparent from subsequent description.

The piston device 9 is operatively secured to the stem 5, as through the medium of a stud 16 which extends centrally through said device, said stud at its one end having screw-threaded engagement within an aligned opening in the projecting end of said stem, while its opposite end has a head 17 which is secured against the face of piston head 11 farthest from the piston head 10. The head 17 of stud 16 is adapted for abutting engagement with a coaxially aligned, projecting stop element 18 formed integrally with a cover 19 sealingly secured to the lower end of casing portion 6, for thereby defining by such abutting engagement the previously mentioned normal position of the slide valve 4, which is operably connected to the piston device 9 through the medium of said stud and the stem 5. A pressure chamber 20, defined by the piston head 11, casing portion 6 and the cover 19, is chargeable with fluid at main reservoir pressure or ventable to atmosphere by way of an actuating pipe (not shown) and a passage 21. Under action of fluid under pressure supplied to chamber 20, the piston device 9 is adapted to move the slide valve 4 to its aforementioned release position, defined by abutting engagement of a radial shoulder 22 provided on said piston device, intermediate the piston heads 10, 11, with a shoulder 23 formed by that part of casing portion 6 encircling the adjacent end of bore 7.

The selector valve device 1 further comprises a pneumatic relay valve device 24 operable to admit fluid under pressure to, or vent the same from, the control chamber 12 for assuring positive movement of the piston device 9 for thereby assuring that the slide valve 4 will assume its previously described normal position or release position, respectively, in the manner to be brought out in subsequent description.

The relay valve device 24 comprises a flexible diaphragm 25 clamped at its outer peripheral edge between the casing portion 6 and the cover 19, thereby separating the pressure chamber 20 from a non-pressure chamber 26 which is open to atmosphere by way of a port 27. A rod 28 is operably connected at its one end to the non-pressure side of the diaphragm 25 through the medium of a follower 29 which is guided within the wall of the non-pressure chamber 26 to prevent undesired cocking of said rod. The rod 28 has a normal position, defined by abutting engagement of the diaphragm 25 with a stop element 30 formed integrally with the cover 19, and a release position, defined by engagement of the follower 29 with an annular transverse shoulder 31 formed in the casing portion 6 intermediate the ends of the non-pressure chamber 26. The rod 28 extends through the chamber 26 and projects exteriorly thereof in sealing, slidably guided engagement with the wall of an aligned opening 32 formed in casing portion 6, the projecting end of said rod being operatively connected to a supply valve 33 disposed within a pressure chamber 34, which is in constant fluid pressure communication with the slide valve chamber 3 by way of a port 35. A spring 36 disposed in the non-pressure chamber 26 is suitably arranged about the rod 28 and between the follower 29 and casing portion 6 to urge said rod toward its previously defined normal position.

The supply valve 33 is adapted for seating engagement with a seat 37 formed on one end of an annular element 38 which, in turn, is slidably guided within a bore 39 provided in a casing portion 40 suitably secured to the casing portion 6. The element 38 has at its opposite end an integrally formed exhaust valve 41 disposed in a chamber 42 and adapted for seating engagement with a seat 43 which is formed on casing portion 40. A spring 44 disposed in chamber 42 is suitably arranged between the exhaust valve 41 and a recessed plug 45 closing said chamber, for urging said valve toward engagement with its seat 43. The chamber 42 is in constant fluid pressure communication with the control chamber 12 by way of a pipe 46 for permitting pressurization of said chamber 12 to be controlled according to position of the rod 28, as will be brought out in subsequent description of operation.

The element 38 is of reduced diameter for a part of its length adjacent the valve 41, providing an annular recess 41a which is open through casing ports 47 to an exhaust chamber 48, which in turn is open to atmosphere by way of a port 49 in casing portion 40. The element 38 has a central bore 50 open at one end to chamber 42 and a larger, coaxially aligned bore 51 open at one end to and encircled by the valve seat 37, the two bores extending inwardly from opposite ends of said element to an annular shoulder 52 at the junction of said bores. A fluted stem 53, slidably guided within the bore 51, is attached at its one end to the supply valve 33 for maintaining said valve in coaxial alignment with its seat 37; the length of said stem being shorter than the depth of said bore, as defined by shoulder 52, to assure full seating of said valve without interference between said stem and said shoulder. With the supply valve 33 unseated, the fluted stem 53 is adapted to establish fluid pressure communication between the chambers 34 and 42 by way of the bores 51 and 50.

*Operation*

In subsequent description of operation it will be assumed that the reader is familiar with the operation of the fluid pressure brake apparatus disclosed in the aforementioned patent to Gorman. As a consequence of this assumption, only those details of operation will be hereinafter described as will enable an understanding of this invention.

In operation, assume initially that slide valve chamber 3 is pressurized with fluid at a pressure such as normally carried in the main reservoir on a live locomotive; that the pressure chamber 20 is vented to the atmosphere via passage 21; and that the respective components of the improved selector valve device 1 are in the positions in which they are shown in the drawing to provide for operation of the brakes on the locomotive in unison with those on the connected cars of a train.

With the rod 28 in its previously defined normal position under action of spring 36 as a consequence of the pressure chamber 20 being vented to atmosphere by way of the passage 21 and actuating pipe (not shown), the supply valve 33, operably connected thereto is unseated, and the control chamber 12 is therefore charged with fluid under pressure from slide valve chamber 3 by way of a supply communication defined by the port 35, chamber 34, unseated valve 33, fluted stem 53, bores 51 and 50, chamber 42 and pipe 46; the exhaust valve 41 being maintained in engagement with its seat 43 under action of the spring 44. Pressure of fluid in the control chamber 12 acting on the piston head 11 then maintains the head 17 of stud 16 in engagement with the stop element 18 of cover 19; and, as a consequence thereof, the slide valve 4, operably connected to said piston through the medium of said stud and the stem 5, is maintained in its previously defined normal position.

Assume now that the locomotive is being run as a live engine connected to cars of a train and that the engineer desires to effect release of the brakes on the locomotive independently of those on the connected cars. He actuates the handle of the independent brake valve (not shown) to effect supply of fluid at main reservoir pressure to the pressure chamber 20, in accordance with the usual practice, by way of the aforementioned actuating pipe and passage 21. Pressure of fluid thus supplied to chamber 20 causes the diaphragm 25 to deflect upward and, through the medium of follower 29 and against resistance of spring 36, to carry the rod 28 toward the annular element 38. During this movement, the rod 28 successively carries the supply valve 33 into engagement with its seat 37 and then, through such engagement, advances the element 38 toward chamber 42, thereby moving the exhaust valve 41 away from its seat 43 against resistance of the spring 44 until such movement is terminated by abutting engagement of the follower 29 with the shoulder 31, at which time said rod will be disposed in its previously defined release position. With the exhaust valve 41 unseated, fluid under pressure is vented from the control chamber 12 to atmosphere by way of an exhaust communication defined by the pipe 46, chamber 42, unseated valve 41, recess 41a, ports 47, exhaust chamber 48 and port 49. As fluid under pressure is thus vented from control chamber 12, pressure of fluid in the chamber 20 acting on the piston head 11 will cause the piston device 9 to move toward chamber 3 and operatively shift the slide valve 4 into its previously defined release position, in which the brakes on the locomotive will release independently of those on the connected cars, or in which an application of locomotive brakes will be prevented if the brakes on the cars are applied, according to the well-known practice.

Assuming now that the engineer desires to permit operation of the brakes on the locomotive in unison with those on the connected cars, he actuates the handle of the aforementioned independent brake valve to cause fluid under pressure in the chamber 20 to be vented to atmosphere by way of the passage 21. A fluid under pressure is thus vented from chamber 20, the follower 29 under action of the spring 36 carries the rod 28 into its previously defined normal position. During this movement of the rod 28, the spring 44 acting through the medium of the exhaust valve 41 causes the seat element 38 to follow the downward movement of said rod and maintain the supply valve seat 37 in engagement with the supply valve 33, until said exhaust valve engages its seat 43; whereupon continued movement of said rod will unseat said supply valve. With the exhaust valve 41 seated and the supply valve 33 unseated, fluid under pressure will flow from chamber 3 to the control chamber 12 by way of the previously defined supply communication. Pressure of fluid thus supplied to the control chamber 12 acting on the piston head 11 will cause the piston device 9 to carry the slide valve 4 into its previously defined normal position, as will be understood from preceding description.

Assume now that the locomotive is being hauled as a dead engine. Since under such conditions the brakes on the locomotive are always controlled in unison with those on the connected cars, the handle of the aforementioned independent brake valve will be disposed in a position in which the chamber 20 is vented to atmosphere; and in accordance with the usual practice, the slide valve chamber 3 will be charged with fluid at somewhat less than brake pipe pressure. With the chamber 20 devoid of fluid under pressure, the rod 28 will be in its previously defined normal position by virtue of the action of spring 36, and the control chamber 12 will be charged with fluid under pressure from slide valve chamber 3 by way of the previously defined supply communication. Despite the reduced pressure of fluid in the control chamber 12, the pressure of such fluid acting on the relatively large piston head 11 will actuate said piston head to cause the slide valve 4 to positively assume, and to remain in, its previously defined normal position, as will be understood from previous description.

Summary

It will now be seen that the slide valve 4 of the improved selector valve device will positively move into its normal position to provide for operation of the brakes on the locomotive in unison with those on connected cars of a train, regardless of whether the locomotive is run as a live engine for hauling the train, or is hauled dead along with said cars; also said slide valve will positively assume its release position when such is desired.

It will also be seen that modification of existing equipment by adding the improved structure, including the piston device 9 and relay valve device 24, may be readily accomplished by disconnecting from the conventional casing portion 2 the casing portion which formerly housed the slide valve actuating pistons and connecting to said casing portion 2 the casing portion 6 which, in turn, carries casing portion 40 and cover 19; and by thus utilizing the conventional casing portion 2 and structure associated therewith, including the slide valve 4 and stem 5, the cost of effecting such modification is desirably held to a minimum.

Having now described my invention, what I claim as new and desire to secure by Letters Patent, is:

1. In a locomotive fluid pressure brake apparatus, the combination with a first casing portion having a first chamber constantly charged with fluid under pressure from a source thereof, a slide valve slidably mounted in said first chamber and having one position for releasing the brakes on such locomotive independently of those on the connected cars of a train and another position for permitting the brakes on such locomotive to be controlled in unison with those on said cars, and an operating stem connected at one end to said slide valve and at the opposite end projecting exteriorly of said first casing portion, of a second sectionalized casing portion mountable on said first casing portion and having a first bore for accommodating with substantial radial clearance the projecting end of said stem, a piston device comprising a small piston head cooperatively connected with a larger, coaxially aligned piston head, said small piston head being slidable in sealing engagement with the wall of said first bore and operatively connected to the projecting end of said stem, and said larger piston head having slidable sealing engagement with the wall of a second bore in said second casing portion and subject at one side to fluid pressure in a control chamber and at the opposite side to fluid pressure in another chamber, a communication by way of which fluid under pressure is adapted to be supplied to said other chamber from said source and released from said other chamber to atmosphere, and a relay valve device controlled by pressure of fluid in said other chamber and operative upon supply of fluid under pressure to said other chamber to release fluid under pressure from said control chamber for enabling said piston device to shift said slide valve to said one position and operative upon release of fluid under pressure from said other chamber to supply fluid under pressure from said first chamber to said control chamber for causing said piston device to shift said slide valve to said other position.

2. For use with a brake controlling valve device of the type employed in the 24-RL locomotive brake equipment and comprising a first casing portion having a first chamber adapted to be constantly charged with fluid under pressure and exposed to the exterior of said casing portion and within which chamber is mounted a slide valve having one position providing for release of the brakes on such locomotive independently of those on the connected cars of a train and another position providing for control of the brakes on said locomotive in unison with those on said cars, and an operating stem operatively connected to said slide valve and projecting exteriorly of said casing portion, the combination of a second sectionalized casing portion mountable on said first casing portion in surrounding relation to the projecting end of said stem, a piston slidably mounted in said second casing portion in coaxial relation with said stem and subject at one side to fluid pressure in a control chamber and at the opposite side to fluid pressure in another chamber, means operably connecting said stem to said piston, sealing means associated with the last named means for preventing direct fluid pressure communication between said first chamber and control chamber, a communication through which fluid under pressure is adapted to be supplied to and vented from said other chamber, relay valve means in said second casing portion responsive to supply of fluid under pressure to said other chamber to vent fluid under pressure from said control chamber for assuring that fluid pressure in said other chamber acting on said piston will cause movement of said slide valve to said one position, said relay valve means being responsive to release of fluid under pressure from said other chamber to supply fluid under presusre from said first chamber to said control chamber for thereby assuring that said piston will move said slide valve to said other position.

3. An arrangement for selectively moving the selector slide valve of the independent application and release portion of the control valve device of a 24–RL brake equipment to either of its two different positions in accordance with absence or presence of fluid under pressure in an actuating pipe passage in said control valve device, which control valve device compirses a casing having said passage and also having a valve chamber open at one end to one face of said casing and adapted to be constantly supplied with fluid under pressure and containing said slide valve to which is connected an operating stem, said arrangement comprising another casing section adapted to be secured to said face over said one end of said valve chamber and having two piston bores of different diameters axially spaced apart in coaxial relation with said stem and with the bore of smaller diameter arranged between said valve chamber and the bore of larger diameter, the outer end of which is open to a face of said other casing section opposite said one face of said one casing section, a cover secured to said other casing section closing the said outer end of said larger bore, two pistons slidably mounted in said bores of different diameters, respectively, cooperating to form between their adjacent faces a control chamber, the smaller piston being subject on its opposite face to pressure of fluid in said valve chamber, and said cover cooperating with the said piston of larger diameter to form at the opposite side of said larger piston another chamber, a passageway in said other casing section connecting said other chamber to said actuating pipe passage, means for connecting said stem to said pistons for movement thereby, movable abutment means in said other casing section also subject to pressure of fluid in said other chamber, valve means in said other casing section connected to said movable abutment means and operative thereby upon supply of fluid under pressure to said other chamber to open said control chamber to atmosphere, and means operative to actuate said valve means in response to release of fluid under pressure from said other chamber to establish a fluid pressure supply communication from said first chamber to said control chamber, whereby said piston of larger diameter will move said slide valve to one of its said positions upon supply of fluid under pressure to said actuating pipe passage and to the other of its said positions upon release of fluid under pressure from said actuating pipe passage.

References Cited in the file of this patent
UNITED STATES PATENTS

| | | |
|---|---|---|
| 1,937,244 | Pelton | Nov. 28, 1933 |
| 2,283,826 | Soehner | May 19, 1942 |
| 2,464,977 | Gorman | Mar. 22, 1949 |